United States Patent

Winstead

[15] 3,676,537
[45] July 11, 1972

[54] CONTINUOUS METHOD OF EXTRUDING AND THERO-FORMING SKIN-COVERED FOAMED THERMOPLASTIC ARTICLES

[72] Inventor: Thomas W. Winstead, 2 Overlook Lane, Baltimore, Md. 21210

[22] Filed: Dec. 8, 1969

[21] Appl. No.: 882,866

Related U.S. Application Data

[63] Continuation-in-part of Ser. No. 508,417, Nov. 18, 1965, abandoned.

[52] U.S. Cl............................264/48, 18/4 S, 18/12 TF, 161/160, 161/402, 264/53, 264/90, 264/177 R, 264/210 R, 264/237, 264/321, 264/DIG. 14
[51] Int. Cl......................B29d 7/04, B29d 7/20, B29d 7/24, B29d 27/00
[58] Field of Search ..............264/48, 51, 53, 54, 321, 177 R, 264/210 R, 237, 90, DIG. 14; 18/4 S, 12 TT; 161/160, 402

[56] References Cited

UNITED STATES PATENTS

| | | | |
|---|---|---|---|
| 3,238,565 | 3/1966 | Jacobs | 264/321 X |
| 3,311,681 | 3/1967 | Cherney et al. | 264/48 |
| 3,317,363 | 5/1967 | Weber | 264/321 X |
| 3,391,051 | 7/1968 | Ehrenfreund et al. | 264/48 X |
| 3,422,172 | 1/1969 | Dekker | 264/48 X |
| 3,426,111 | 2/1969 | Simpson | 264/48 |

FOREIGN PATENTS OR APPLICATIONS

| | | | |
|---|---|---|---|
| 291,940 | 7/1965 | Netherlands | 264/51 |

Primary Examiner—Philip E. Anderson
Attorney—Raphael Semmes

[57] ABSTRACT

Three-dimensionally formed articles of foamed thermoplastic material having a low-density core and at least one integral, high-density, thin skin are produced on a continuous basis. A narrow strip of the thermoplastic material is extruded at a high linear rate from an arcuate mouth die, immediately surface-chilled to produce the skin, laterally expanded over a curved mandrel, and fed continuously to apparatus for three-dimensionally forming individual articles. The operating parameters are critically controlled to permit deep-draw three-dimensional forming by utilization of the heat of extrusion.

4 Claims, 3 Drawing Figures

INVENTOR
THOMAS W. WINSTEAD
BY Raphael Semmes
ATTORNEY

CONTINUOUS METHOD OF EXTRUDING AND THERO-FORMING SKIN-COVERED FOAMED THERMOPLASTIC ARTICLES

REFERENCE TO CO-PENDING APPLICATIONS

This application is a continuation-in-part of Ser. No. 508,417, filed Nov. 18, 1965, now abandoned. Reference is also made to earlier filed co-pending applications, Ser. No. 475,734, filed July 29, 1965, now U.S. Pat. No. 3,387,328, issued June 11, 1968; Ser. No. 480,917, filed Aug. 19, 1965, now U.S. Pat. No. 3,479,694, issued Nov. 25, 1969; Ser. No. 506,804, filed Nov. 8, 1965, now abandoned; and Ser. No. 506,805, filed Nov. 8, 1965, now U.S. Pat. No. 3,461,496, issued Aug. 19, 1969.

BACKGROUND OF THE INVENTION

This invention relates to a method of producing three-dimensionally formed articles of foamed thermoplastic material and is more particularly concerned with the utilization of thermoplastic material having a low-density core and at least one integral, high-density skin.

The conventional approach for making formed articles from foamed or cellular thermoplastics is a two-stage process. In the first stage, foamed sheeting is extruded and collected on rolls. The rolls are stored until the second stage, which employs a conventional thermoforming machine for reheating the material on a progressive basis and forming it in molds through the use of differential air pressure, plungers, or both, whereupon the formed web is transported to a cutting machine for severing the formed articles from the selvage. The extrusion operation for producing the sheet material is thus an entirely separate operation (in relation to time and the utilization of heat energy) from the fabricating operation for forming and cutting the articles.

The conventional two-stage process has many limitations affecting cost, quality control, and operational control. Considerable floor space is required for the two-stage operations. Because of the separation of the extrusion and fabricating operations, quality control becomes more difficult and costly. Defects in the sheeting which are not apparent until molding begins can not then be corrected, resulting in the rejecting of large quantities of material. Since foam sheeting has excellent thermal insulating properties, it is difficult and costly to heat it properly during the fabrication step. With certain types of thermoplastic foam sheeting, there is a period of aging during which volatiles used in the foaming process are evolved and replaced by air. Therefore, careful attention must be paid to the time when the reheating in the fabrication step takes place, because the residual content of the volatiles can have an appreciable effect on the final density of the product. This necessitates operational controls which further complicate the manufacturing process. Because of the difficulties in obtaining uniform heat and because of the necessity of waiting until a large percentage of the volatiles have evolved from the material, it is not possible to form the foam sheeting as readily or as deeply as would otherwise be the case.

The two-stage process is not easily automated and has high man-power requirements. Moreover, problems which plague the two-stage process become insurmountable when the articles are formed from foamed thermoplastic having a low-density core covered with an integral skin of the same material. It is extremely difficult to reheat the core to the necessary forming temperature without adversely affecting the skin. The presence of the skin tends to produce uneven reheating of the sheeting, resulting in imperfections in the formed articles. Molecular orientation of the skin, which may be important to the overall strength of the formed product, is reduced or destroyed by reheating. Continuous processes developed heretofore, in which extrusion and fabrication steps follow without interruption, have not met the requirements for successful application to low-density foamed thermoplastics.

BRIEF DESCRIPTION OF THE INVENTION

It is accordingly a principal object of the present invention to provide an improved method for producing formed articles of foamed thermoplastic material, specifically three-dimensionally formed articles having a low-density core and at least one high-density integral skin of the same material, and in which the depth of forming is not seriously limited by the skin.

A more specific object of the invention is to provide a unique method of producing such articles economically on a continuous basis, in which the forming operation takes place without interruption after production of the extruded foam material without the necessity for reheating the material, and in which core density and skin thickness and molecular orientation are readily controlled and maintained.

Yet another object of the invention is to provide a method of producing far more perfect light-weight thermoplastic articles than has heretofore been possible, and of producing such articles consistently on a mass production basis.

Briefly stated, in accordance with a preferred embodiment of the present invention, thermoplastic material, such as polystyrene resin stock, for example, heated to an appropriate temperature and mixed with a volatile blowing agent, is extruded under high pressure from a curved lip die along radii of the die lip curvature, so as to produce a flat narrow-strip low-density foamed extrudate at high linear rates. At least one surface of the extrudate is chilled to a critical degree at a location critically close to the die lips to produce a thin, high-density skin. The extrudate is then spread laterally over a curved mandrel, from which it is immediately fed to rotating molding apparatus. Critical operating parameters permit deep-draw three-dimensional molding on a continuous basis without requiring reheating of the extrudate, without adversely affecting the density and cell structure of the foam core and without introducing wrinkles or other imperfections in the integral skin.

BRIEF DESCRIPTION OF THE DRAWINGS

The invention will be further described with reference to the accompanying drawings, which illustrate typical apparatus for performing the process of the invention, and wherein.

DETAILED DESCRIPTION OF THE INVENTION

Figure 1:
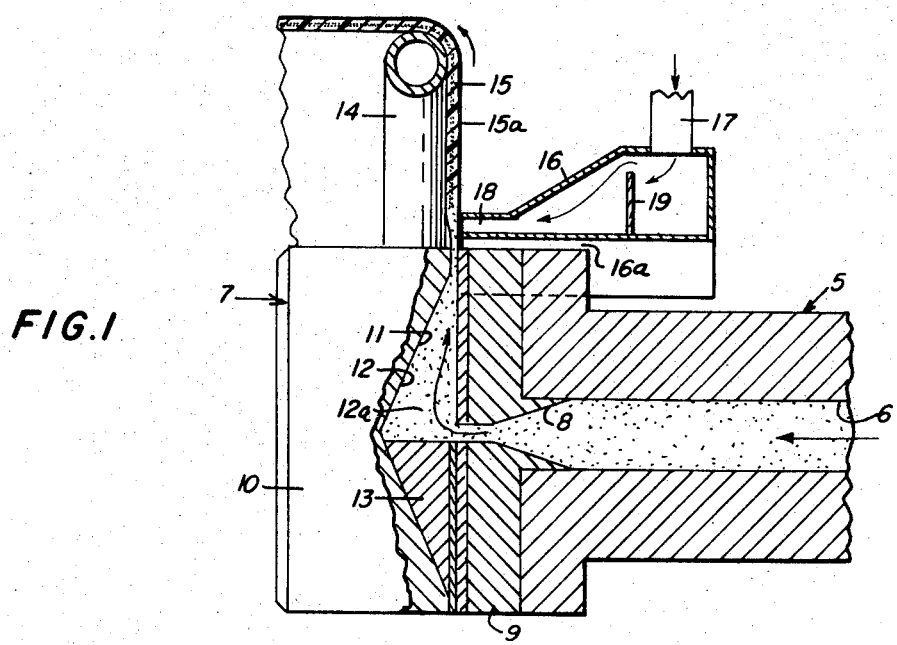
FIG. 1 is a longitudinal sectional view illustrating a typical extruder head, chiller, and mandrel employed in performing the method of the invention.

The present invention is concerned with the production of low-cost, three-dimensionally formed articles of thermoplastic material having a low-density core and at least one, thin, high-density, integral skin of the same material, which may be provided continuously over either or both of the opposite major surfaces of the core or at selected regions thereof. "Low-density" as employed herein means a density within the range of from less than 1 up to 4 pounds per cubic foot, and very preferably less than about 3 pounds per cubic foot. "High-density" means a density of from about 50 to about 100 pounds per cubic foot, or substantially the same density as the resin stock prior to extrusion. "Three-dimensionally formed articles" means articles molded individually to a depth of at least of the order of three-eighths inch in orthogonal planes, e.g., trays or cups. It has been discovered, as will be later set forth in detail, that acceptable articles of this type cannot be produced economically by prior techniques because of limitations affecting various phases of conventional processes. Consider first the conventional extrusion dies. When foamed plastics are extruded from a flat slit die, the resulting extrudate immediately expands upon emergence from the die lip. This expansion is three-dimensional, and the amount of expansion depends fundamentally upon the resulting density. For example, if a resin is extruded which has an original density of 60 pounds per cubic foot and by the addition of cells the density is reduced to three pounds per cubic foot, the extrudate expands about 2.7 times in each dimension as it emerges from the die. Assuming for the moment that the expansion in thickness of the extrudate is of little concern (since the thickness dimension of the sheet is relatively small to begin with) and that longitudinal expansion is of little concern (since the rate at which the extrudate is taken off can readily be made 2.7 times the take-off speed which would prevail if the material were not expanding), there still remains the problem of the width dimension which increases 2.7 times. For example, if the extrudate is 3 inches wide before expansion at the die lip, the sheet after expansion is over 8 inches. At the center line of the die orifice, this is of no particular concern, inasmuch as the center line continues to remain the center line as the material expands and is taken off. However, the edge of the extrudate, in the case of a flat slit die, must move rapidly from a point 1½inches from the center line to a point of over 4 inches from the center line. Since most of the expansion in a cellular material occurs very close to the die orifice, the geometry of suitable apparatus to cope with this width-wise expansion problem is critical. If this expansion is not properly accommodated, the extrudate will corrugate or wrinkle, particularly with skin-covered, low-density foam, resulting in poor quality or an unusable product. Thus, where a flat, skin-covered, low-density sheet is necessary in order to accommodate subsequent processing requirements, the need for appropriate apparatus to accommodate expansion and prevent wrinkling becomes of utmost importance. The flat slit die fails in this respect.

In tubular extrusion of foam sheet, the wrinkling or corrugating problem is controlled to some degree by the "bubble method." As the tube emerges from the die orifice, it is expanded by the internally trapped air, or sometimes by an internal shoe, which helps to remove the wrinkles or corrugations. However, this method has geometric limitations which preclude the extrusion and spreading of low-density foam and the collapsing or slitting of the tubular extrudate close enough to the die and soon enough to permit subsequent operations while the extrudate is still sufficiently pliable. Furthermore, as a practical matter, it is not possible to provide a tubular extrudate with an integral skin at one side only, because the tube becomes uncontrollable if an attempt is made to chill only one portion of the entire circumference.

Even if conventional extruding techniques could produce the required low-density foam with wrinkle-free skin, it would not be possible, in accordance with prior methods, to produce the desired low-cost articles. Since foam cools rapidly upon leaving the extrusion die and since the cooling effect is much greater in low-density foam, insufficient heat is retained in the extrudate to permit three-dimensional (deep-draw) forming. The provision of a skin by chilling of the extrudate only aggravates the problem. Moreover, conventional chilling techniques are ineffective to produce a smooth thin skin upon low-density foam, because the chilling takes place after expansion of the surface has already begun.

In accordance with the present invention, it has been found that the solution to the problem of providing low-cost, skin-covered, low-density, thermoplastic foam articles of the type set forth above requires the imposition of certain critical parameters upon the production method. These parameters will be considered in detail while suitable apparatus for carrying out the method of the invention is described with reference to the drawings.

Figure 3:
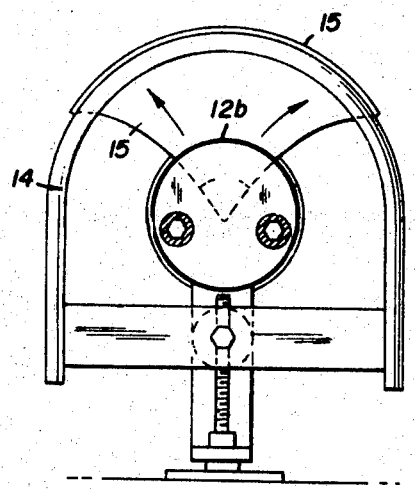
FIG. 3 is an end view showing the extrusion die and mandrel and illustrating an extruded sheet of foamed thermoplastic passing over the mandrel from the die lips.

Referring to FIG. 1, 5 represents an extruder body having a longitudinally extending central passageway 6 fed from a suitable source of molten plastic (not shown) under pressure. The thermoplastic raw material may be a composition comprising polymers of ethylenically unsaturated monomers, such as polystyrene, polyethylene, polyvinylchoride, or polypropylene, for example general purpose styrene containing 15 percent by weight of a non-inflammable volatile liquid blowing agent, such as trichlorofluoromethane (or pentane), and a suitable nucleating agent, such as 1 percent by weight of inorganic talc. The discharge end of the passageway or barrel 6 passes through an extruder head 7 and preferably terminates in communication with a converging inlet port 8 located centrally of a circular die plate 9. An end cap 10, also circular in shape, registers with the plate 9, being secured in place by any suitable means, and the inner face of the end cap is conically recessed, as at 11, providing, with the plate 9, a feed chamber 12 which is coaxial with the passageway 6 converging opening 8. The conical front wall of the chamber terminates slightly inward of the periphery of the end cap 10 and is circumscribed by a narrow annular wall at the periphery. An adapter 13 conforms substantially to the surface contour of the chamber 12, with the exception that the upper portion thereof is provided with a V-shaped cut-out area 12a which, when the adapter is installed, provides upwardly diverging radial confines for the chamber 12, thereby providing a substantially fan-shaped die reservoir, the upper portion of which terminates in cylindrical lips 12b (see FIG. 3), all as shown in the said co-pending application Ser. No. 475,734 now U.S. Pat. No. 3,387,328. The arc-length of the cylindrical die opening is chosen to produce a narrow-strip extrudate, which will be considered later in detail.

Also, as described in the said co-pending application Ser. No. 475,734, now U.S. Pat. No. 3,387,328, to ensure the controlled spreading of the extrudate after leaving the die lips, a mandrel or spreader 14 is provided adjacent the die lips. This mandrel preferably comprises a vertically disposed, transversely arcuate tube which is supported in an upright position, so that as the extrudate 15 leaves the die lips, it is spread laterally and is supported so as to provide a maximum possible accommodation of the width-wise expansion of the extrudate. See FIG. 3.

As already noted, the extruded material emerges from a cylindrical die face rather than a flat die face. Internally within the die, the material flow begins at a point which is equidistant from all points on the cylindrical die lips 12b. This provides a uniform distribution of pressure and flow at all points along the lips and thereby eliminates strains or distortions in the extrudate. As the extrudate emerges from the orifice and expands, it continues to move radially outward to the mandrel or spreader. This geometry provides, again, the maximum possible accommodation of the width-wise expansion. The extruded strip is then passed over the mandrel and may be drawn away at an oblique or acute angle with respect to the plane of the mandrel. If the mandrel is concentric to the cylindrical die opening, nothing further is gained by taking away the extrudate from the mandrel at more than a 90° angle to the plane formed by the mandrel. However, if the take-away angle is less than 90°, becoming acute with respect to the plane of the mandrel or more nearly parallel to the mandrel plane, the shape of the mandrel may then be made other than concentric with the die opening, either by making it elliptical in shape, rather than circular, or by moving it closer to the die opening, which effectively does the same thing. In practice, the extruded sheet may be drawn away from the mandrel in a direction almost parallel to the plane of the mandrel, that is, almost opposite to the direction of extrudate flow from the die opening to the mandrel. Although not absolutely essential to the process, the geometry of the direction of extrusion (upward) and the reversal (downward) as the extrudate flows to the bottom of the forming wheel 20 (FIG. 2) is considered quite advantageous. This permits maximum employment of the circumference of the forming wheel for cooling and setting the formed articles prior to their tangential stripping from the top of the forming wheel. If other geometry is used, one is faced with the loss of the greater portion of the circumference of the forming wheel for cooling, and/or a removal point which would not permit convenient location of the cutting apparatus 22 and the maintenance of suitable tension between the two machines.

In the space between the cylindrical die orifice and the mandrel, the corrugations or wrinkles of an expanding cellular sheet or strip are very efficiently and quickly removed. It will be noted that the mandrel is hollow in order to provide for circulating coolant, and its surface may be coated with an antifriction surface coating. The flow of material over the mandrel not only serves to remove corrugations or wrinkles which would otherwise form upon expansion of the extrudate, but also, if proportioned properly and positioned properly, the mandrel can actually provide transverse stretch to the extruded sheet as it is pulled longitudinally around the mandrel. This has the advantage of providing a certain amount of biaxial orientation, which is desirable with certain types of materials to improve physical properties.

To provide an integral skin upon the foam extrudate core, an arcuate housing 16 is mounted immediately adjacent the discharge orifice from the extrusion chamber 12a. Cooled air or other gas is fed to the housing through tube 17 from a suitable source (not shown). The housing preferably converges at its discharge end to form an arcuate discharge slot 18 (generally following the contour of the arcuate die lips) which is directed against the adjacent surface of the extrudate 15. Preferably, a baffle 19 is provided in the housing 16 to facilitate uniformity of the flow of the cooling medium.

As the extrudate 15 progresses from the extrusion chamber 12a, it expands rapidly. It is essential, in accordance with the present invention, that the surface to be provided with a skin be chilled very rapidly to a temperature at which the chilling precludes any substantial expansion of the chilled surface, and does not merely shrink the cells at the surface or prevent their full expansion to a sphere. Thus, although the extrudate 15 expands rapidly as it emerges from the die, the chilled surface remains unexpanded and provides a molecularly integral thin skin 15a for the foam core. The thickness of the skin is directly controlled by the rate of flow and temperature of the cooling medium and by the rate of extrusion.

The method of the invention is applicable to thermoplastic extrudates containing undissolved blowing agents (such as gas in small spheres under pressure) and is particularly applicable to thermoplastic extrudates containing dissolved blowing agents, such as, for example, styrene containing pentane. In the former case, the chilling prevents the expansion of cells near the surface of the extrudate by cooling the surface, just as the extrudate emerges from the die, to a sufficiently low temperature as to cause such an increase in viscosity of the thermoplastic that it will not flow to accommodate cell growth even as the pressure on the extrudate is reduced to atmospheric. In the latter case, where a dissolved blowing agent has been incorporated, the method provides for chilling of the surface in a similar manner, but the dissolved blowing agent is prevented in the first place from forming gas cells because the increase in viscosity and decrease in temperature at the surface of the extrudate actually reduce the boiling point of the incorporated blowing agent to a level where it remains in its liquid phase. Typically, the chilled temperature of the skin is about 220° to 235° F.

The cooling effect on the surface does not materially affect the temperature of the foam extrudate below the surface, because of the excellent thermal insulating quality of the foam. As a result, 90 percent or more of the total thickness of the foam remains sufficiently hot and pliable for subsequent forming operations even though the skin surface has been chilled sufficiently to prevent its expansion. Because the skin is relatively thin, it can be stretched in forming operations in spite of the fact that its temperature may actually be below optimum forming levels.

As the extrudate emerges from the die, it expands rapidly, because the blowing agent, which previously has been in solution due to pressures in the system of perhaps 500 psi or more, is no longer under more than atmospheric pressure (approximately 15 psi) and, at the lower pressure, comes out of solution and volatilizes. This change of state naturally absorbs heat energy, thus rapidly lowering the temperature of the extrudate. The decrease of temperature, which is especially pronounced in low-density foam, is further accelerated by heat loss through radiation and convection. When the extrudate surface is then chilled deliberately to impart a skin thereto, heat loss by convection or conduction chilling further reduces the temperature of the material.

It has been discovered, in accordance with the invention, that if three-dimensional forming is to be carried out through utilization of the heat of extrusion (without requiring reheating of the extrudate), the extrudate should be produced as a thin strip which is fed at a high feed rate to the molding apparatus. Whereas, generally, one might suppose that it would be best to extrude a fairly wide sheet in order to have a web width which will accommodate a number of cavities when formed, just the opposite is desirable in this process. The difficulties of removing corrugations from a wide flat sheet after emergence from the die are almost insurmountable in low-density foams. Also, the slow linear speed generally associated with wide webs inherently includes a time factor which is particularly detrimental to subsequent forming of foam materials from a sheet. Because of the cooling effect upon expansion immediately upon emergence from the die orifice, it is desirable to form the material within the shortest possible interval of time; a narrow web fed at high speed reduces this time increment and also minimizes heat loss from the material (which seriously affects formability).

Since a high percentage of volatile blowing agents may be employed in extrudable foams, such as styrene, and since such agents have a plasticizing effect on a polymer, it is only by extruding narrow strips at high linear rates that the beneficial plasticizing effects can be gained during the next forming step.

The high linear rate of feed is also an important factor in eliminating the possibility of crushing of the strip as it passes over the spreader or mandrel. A wider sheet, and the inherently slower linear rate resulting therefrom, would make cell collapse a definite difficulty. However, in the method of the invention, the extruded material is still expanding as it reaches the mandrel, and its temperature is well above the boiling point of any volatile blowing agents which might be used, thus eliminating the problem. The cells, having retained much of the volatile blowing agent, are still under reasonable internal pressure, making them resilient enough to resist crushing.

When a narrow strip is used, as in the present invention, corrugations or wrinkles in the web occuring at the lower densities can be overcome by stretching the material to a greater arc distance of the mandrel. This is not possible with a wide or tubular extrudate until after damage caused by low-density corrugations has already resulted. This problem is particularly important with skin-covered materials, as the skin itself reflects these variations in the finished product's surface. (The choice of blowing agent affects the skin gloss; e.g., a blowing agent such as trichlorofluoromethane will produce a much higher skin gloss on styrene than dichlorodifluoromethane, in which styrene is less soluble.)

The high linear speed of the narrow-strip extrudate of the invention is also important to the proper formation of the skin. If extrusion speeds are too slow, expansion will take place at the very edge of the die lip or even within the die lip itself, thus preventing the application of cooling medium until it is too late to prevent expansion of the surface. For example, it has been found that at an output rate of 200 pounds styrene extrudate per hour, a density of 2.5 pounds per cubic foot, a final thickness of 0.125 inches, a stock temperature of 300° F., and a final strip width of 6 inches, the expansion does not occur until a point about 0.100 inch from the die lip. This provides ample space to direct a chilling medium against the surface to prevent expansion and form a skin. On the other hand, if the web width is doubled, all other variables remaining the same, the available distance from he die lip for adequate chilling becomes so short that it is almost impossible to achieve a good skin.

The narrow-strip, high-linear-speed concept of the invention sufficiently compensates for heat losses to permit production of low-cost, low-density products in a continuous or integrated system. Prior production methods, such as those employing higher-density extrudates in the form of a tube, are incapable of producing the results of the present invention whereby skin-covered, low-density foamed articles are produced. With the higher densities employed in the prior art, heat loss due to volatilization is considerably less, and it is possible to reheat the extrudate. The addition of heat from outside of the extrudate, which must pass through the outer portions in order to reach inner portions is extremely difficult with low-density foam, because of the exceptional thermal insulating characteristics of the foam itself. Since heat transfer is so poor in low-density foams, time and distance factors become critical. On webs of even fairly low density produced by tubular extrusion the majority of heat content from extrusion is lost by the time the tube is slit or collapsed, and forming is not possible without the addition of external heat. Furthermore, because of the poor heat transfer characteristics of low-density foam, an uneven temperature profile is developed across the web thickness during reheating, which results in poor forming or stress in the finished product. Unevenness of temperature profile is increased by any effort to decrease time of heat by increasing intensity of heat, and, therefore, uniformity is sacrificed.

It might be assumed that stock temperatures coming from the extrusion die could be increased in order to compensate for the loss of heat. However, with foam materials there is a limit beyond which the stock temperature cannot be increased without causing cell collapse and/or brittleness. For example, with styrene this limit is of the order of 300° F. in the die chamber. The level of heat drops rapidly upon expansion of the extrudate, typically 50° F. within 12 inches or so from the die lips, even on a narrow strip at high output rates. The narrow-strip, high-feed-rate concept minimizes the problem of corrugations and spreading of the material as it expands after emergence from the die orifice; it minimizes the loss of heat content which is inherently so rapid in an expanding low-density foam extrudate; it minimizes the loss of volatiles which have beneficial plasticizing effects; and, as a result, it maximizes the capability of making low-density, deep-drawn articles or high quality at low cost.

AS stated above, chilling of the surface of the extrudate to form the skin must take place at a location extremely close to the die lips. Yet, the chilling must be isolated from the die lips. Thus, the cooling housing 16 is located very close to the die lips 12b, but an air space 16a is provided between the housing 16 and the extrusion head to maintain the proper cooling temperature in the housing 16 and to avoid cooling the extruder head and die. The slot 18 is designed to facilitate the discharge of a high velocity uniform flow of air or other cooling gas upon the adjacent surface of the extrudate, the amount of gas, its rate of flow, temperature, and the rate of extrusion being variables which contribute to the thickness of the skin. The skin must be thin enough to permit stretching during expansion of the foam core and during the three-dimensional forming.

In the embodiment of the die shown in FIG. 1, the cooling space 16a is relied upon to insulate the extrusion head from the cooling unit. This may also be accomplished by providing a thermal barrier between these two units. It is important that this thermal barrier or the insulating air space be effective to maintain a sharp temperature gradient between the lips of the die and the skin-producing element. In a typical temperature profile, the die body 7 is maintained at approximately the same temperature as the extrusion stock, for example, 300° F., while the cooling unit 16 and the cooling medium are maintained at a temperature of perhaps 0° F. The temperature of the cooling unit 16 may be controlled by any conventional temperature-regulating device.

Figure 2:
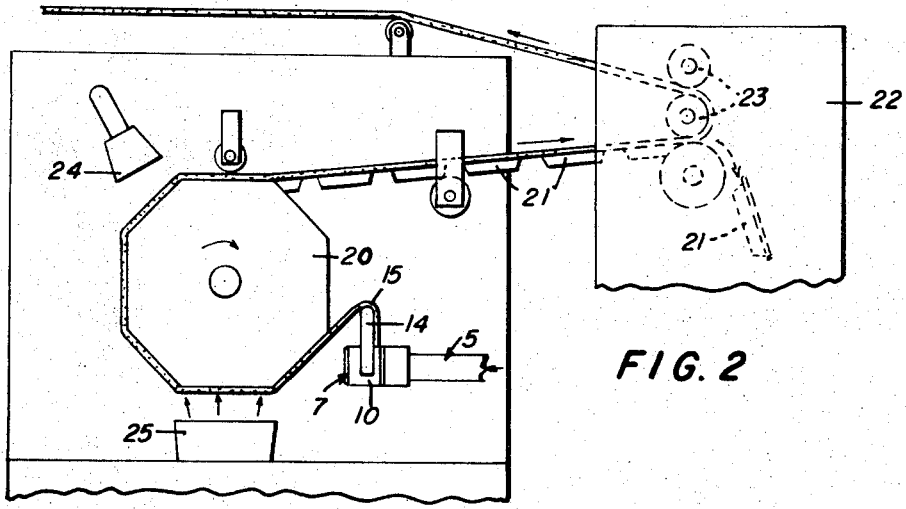
FIG. 2 is a diagrammatic view illustrating the association of forming and article-separating apparatus with the apparatus of FIG. 1.

FIG. 2 illustrates diagrammatically the feeding of the extrudate 15 continuously to the forming wheel 20, which may be of the type disclosed in the said co-pending application Ser. No. 480,917 now U.S. Pat. No. 3,479,694, which vacuum forms the articles 21 upon the sheet 15. By the sequential valving described in that application, vacuum is applied to the successive molds of the forming wheel as the sheet is tangent to the respective flat surfaces on the underside of the forming wheel, after the sheet has been flattened and stretched by the spreading yoke or mandrel 14.

The formed articles, while still carried by the sheet 15, are then stripped tangentially from the upper side of the forming wheel, and the sheet-carried articles 21 are conducted to the cutting unit 22, where the formed articles are removed from the sheet and directed to a stacking unit (not shown). The remaining selvage of sheet 15 is thereupon conducted to a granulating machine by means of the reverse guide rolls 23, all as described in the said co-pending application Ser. No. 480,917, now U.S. Pat. No. 3,479,694.

Air cooling means, such as diagrammatically shown at 24 and 25, may be directed against the indicated areas of the sheet passing over the forming wheel 20 to facilitate the forming operation.

Where desirable, the skin may be provided at selected regions of a surface of the extrudate, rather than continuously covering the surface, by controlling the cooling pattern of the cooling medium discharged through the housing 16 (or other cooling unit) or by applying the cooling medium to selected areas of a surface of the extrudate. It is also possible to form skin on selected areas by controlling the interval of application of the cooling effect time-wise in relation to the rate of extrusion. A checker-board effect may be produced in this manner, for example. Skin may be formed on either or both major surfaces of the extrudate, an additional cooling unit, such as unit 16, being provided at the opposite side of the extrudate in FIG. 1 if a double skin is desired.

As indicated in the said co-pending application Ser. No. 506,805, now U.S. Pat. No. 3,461,496 the cooling of the surface or surfaces of the extrudate may be effected by conductive cooling instead of by convective cooling, and in the former case, it is desirable to coat the conductive cooling surfaces with an anti-friction material, such as polytetrafluoroethylene.

Where a soluble blowing agent is employed, an additional advantage of the method of the invention over a two-stage process, as noted above, is that the blowing agent has not had time to escape and is still retained during the forming operation, further enhancing the formability of the sheet due to the plasticizing effect of the blowing agent. Also, in the application of the invention to extrudates containing soluble blowing agents, the maximum orientation can be achieved in both the skin as well as the cell walls themselves. Orientation of the skin takes place as a result of the biaxial stretching of the extrudate as it emerges from the die and expands, and orientation of the cells takes place as a result of the blowing agent within each cell being under pressure at the time of forming and before the blowing agent escapes. Three-dimensional forming of trays or similar articles with a depth of from three-eighths inch to 3 inches, for example, can readily be accomplished by virtue of the invention on a continuous, mass-production basis without reheating the extrudate and without detriment to orientation of skin or cells. Sufficient plasticity is provided to permit deep draws even with the low pressures available in vacuum forming.

The extruded strip, in accordance with the invention, is optimally between 0.020 and 0.300 inch thick after expansion, with an integral skin of thickness between 0.001 and 0.005 inch. The extruded strip is optimally within the range of from less than 1 to a maximum of 18 inches wide after expansion, the arc length of the die orifice being about one-third the expanded width of the strip for low-density foam. It has been found that chilling of the surface of the extrudate to form the skin must commence at a location no more than about 0.050 inch from the die lips and preferably within the range of 0.015 to 0.050 inch. A typical temperature profile beginning with the stock in the die is shown in the following table:

TABLE I

| | |
|---|---|
| Die stock temperature | 300°F |
| ½ inch from die lip | 280°F |
| At mandrel | 270°F |
| At initial forming station | 230°F |
| 90° around forming wheel perimeter | 180°F |

Compared to prior art extrusion-forming methods, the feed rate of the extrudate produced by the invention is very high. Assuming a density of 2.5 pounds per cubic foot and a final thickness of the extrudate of 0.125 inch, for example, the following linear extrudate feed rates are typical for the stated widths and pounds per hour of extrudate produced:

TABLE II

| | 100 No. per hr. | 200 No. per hr. | 300 No. per hr. |
|---|---|---|---|
| 6" width | 128 ft. per min. | 256 ft. per min. | 384 ft. per min. |
| 12" width | 64 ft. per min. | 128 ft. per min. | 192 ft. per min. |

The minimum feed rate is of the order of 40 feet per minute. The size of disposable and packaging products which are produced by the invention dictates that for 90° of all production, extrudate widths will be from 6 inches to 12 inches. The following table gives typical operating conditions:

TABLE III

| Material | General Purpose Styrene | General Purpose Styrene |
|---|---|---|
| Output (lb. per hr.) | 125 | 150 |
| Blowing Agent (%) | 14 | 14 |
| Nucleating Agent | 1% Talc | 1% Talc |
| Stock Temp. of Die (°F) | 295 | 295 |
| Cooling Air Temp. (°F) | 75° | 75° |
| Extrudate Temp. at Spreader (°F) | 230 | 240 |
| Extrudate Temp. at 1st Forming Station (°F) | 200 | 215 |
| Web Width (inches) | 11.2 | 8.2 |
| Web Thickness (inches) | 0.150 | 0.150 |
| Skin Thickness (inches) | 0.0015 – 0.0020 | 0.0015 – 0.0020 |
| Foam Density (lb. per cu. ft.) | 2.4 – 2.7 | 2.4 – 2.7 |

In a typical system for carrying out the method of the invention, the mandrel is located between 2 and 3 inches away from the die lip, and the near edge of the mold at which forming is commenced is about 6 inches from the mandrel along the path of the extrudate.

From the foregoing, it is believed that the invention may be readily understood by those skilled in the art that the invention without further description, it being borne in mind that numerous changes may be made in the details disclosed without departing from the spirit of the invention.

I claim:

1. A continuous method of manufacturing articles from a thermoplastic polymeric resin strip having a foam core and an integral skin of the same material, comprising causing a foamable thermoplastic polymeric resin heated to a plastic state and mixed with a blowing agent under pressure to flow along radials of a laterally diverging die passageway to a transversely arcuate die orifice curved in a plane parallel to the width of said passageway, continuously extruding and feeding a thin, narrow strip of said resin from said die orifice at a feed rate at least of the order of 40 feet per minute and expanding said resin to form a foam with a low density of no more than about 3 pounds per cubic foot, immediately chilling at least one surface of the extrudate, as it emerges from the die, rapidly enough and to a temperature low enough to prevent expansion of said surface and to provide thereon a thin, smooth, high-density skin of said material of thickness of the order of 0.001 to 0.005 inch molecularly integral with the expanded foam, said chilling being commenced at a location spaced from the die orifice a distance of the order of 0.015 to 0.050 inch, continuously spreading the chilled extrudate laterally over an arcuate mandrel as the extrudate is fed from said die orifice and while the extrudate is expanding, to prevent the formation of wrinkles, thereby to form an expanded extrudate strip of the order of 0.020 to 0.300 inch thick and a maximum of about 18 inches wide, and thermoforming a series of individual articles from the spread extrudate to a depth in orthogonal planes of at least of the order of three-eighths of an inch by utilization of the heat of extrusion as the extrudate is continuously fed from said die, said forming being accomplished close enough to said die, and said extrudate being fed rapidly enough to permit such forming.

2. A method in accordance with claim 1, wherein said spreading comprises bi-axially orienting the molecules of said skin.

3. A method in accordance with claim 1, wherein said spreading is accomplished by passing the extrudate over a mandrel spaced about 2 to 3 inches from said die, and wherein said forming commences about 6 inches from said mandrel along the length of said extrudate.

4. A method in accordance with claim 1, wherein the blowing agent is volatile, and wherein said spreading and forming are accomplished while said blowing agent remains under sufficient pressure to provide plasticity for said extrudate.

* * * * *